July 18, 1950  H. A. HEWITT  2,515,958
AUTOMOBILE TIRE
Filed Aug. 20, 1946

INVENTOR.
HAROLD A. HEWITT
BY Kenway & Witter
ATTORNEYS

Patented July 18, 1950

2,515,958

UNITED STATES PATENT OFFICE 2,515,958

AUTOMOBILE TIRE

Harold A. Hewitt, Everett, Mass.

Application August 20, 1946, Serial No. 691,777

1 Claim. (Cl. 152—345)

This invention relates to automobile tires or the like and more particularly to a novel construction embodying an annular chambered rim having mounted therein at its periphery a solid annulus of resilient material having an outer body portion forming a tread for the tire. The rim comprises metallic bottom and side walls spaced apart to provide a gap at the periphery, which gap receives and supports the annulus. Air pressure within the chamber of the rim is adapted to hold the tread annulus in its outermost position and maintain it in air sealing contact with the side walls of the rim and the side walls are so formed that sealing contact is also maintained upon inward movement of the annulus due to reduced air pressure. The production of a novel tire of this nature comprises the primary object of the invention.

In the preferred embodiment of the invention, reinforcing means is provided in the annulus for preventing outward movement of its intermediate portion relative to the marginal portions that engage the side walls, such means preferably extending circumferentially of the annulus between its marginal portions. The annulus is wider than the gap and the rim is provided with annular surfaces at the gap facing inwardly of the chamber and converging outwardly radially of the rim, air pressure in the chamber being adapted to hold the annulus in tight surface contact with these surfaces. Also directly adjacent to and radially inward of said annular surface are like annular surfaces facing outwardly toward said gap and adapted to receive the annulus and form a tight seal when the annulus moves inwardly due to reduced air pressure. The production of a novel construction of this nature comprises a further object of the invention.

Figure 1:
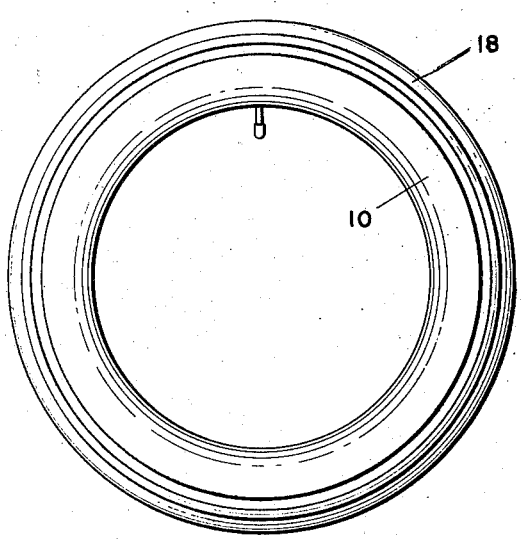
Figure 3:
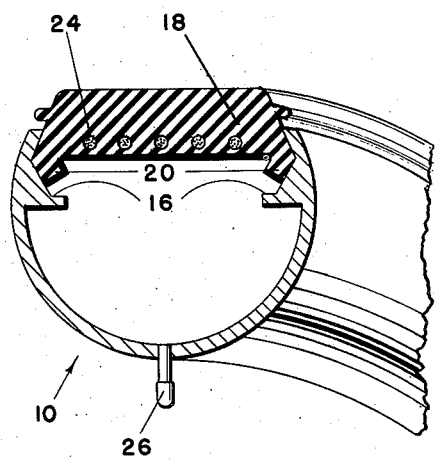
Figure 2:
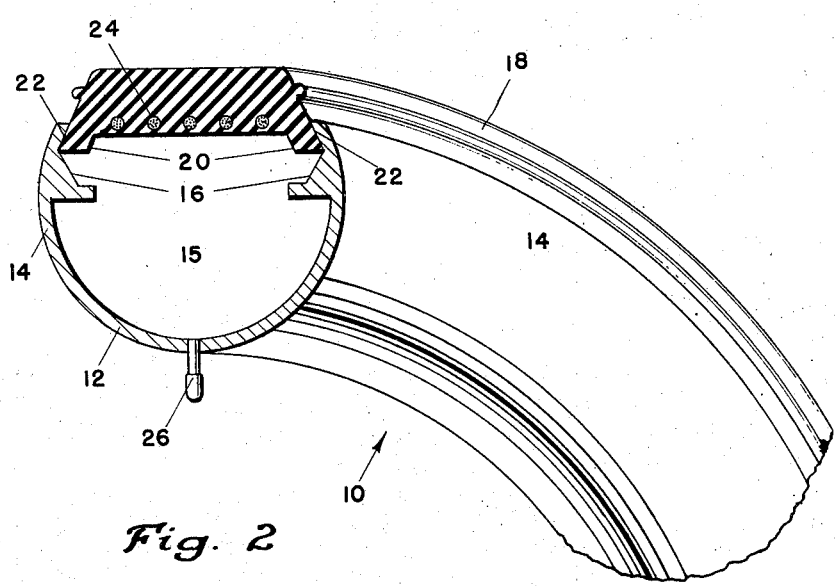

These and other features of the invention will be best understood and appreciated from the following description of preferred embodiments thereof selected for purposes of illustration and shown in the accompanying drawings wherein, Fig. 1 is a side elevation of a tire embodying my invention, Fig. 2 is an enlarged fragmentary view showing the inflated tire in cross section, and Fig. 3 is a like view showing the tire not inflated.

My improved tire comprises a metallic rim 10 adapted to be mounted on or constructed as a part of a wheel. The rim embodies a bottom wall 12 and side walls 14 providing an annular chamber 15 therein. Annular reinforcing and stop ribs 16 are formed integral with the side walls within the chamber which is closed except for an annular gap between the side walls at the periphery of the rim. The gap is adapted to receive a solid annulus 18 of rubber or the like having marginal portions 20 in face to face contact with annular surfaces 22 on the rim at the gap facing inwardly of the chamber and converging outward radially of the rim. The construction is such that air pressure within the chamber maintains the annulus in its outermost position with its portions 20 and surfaces 22 forming a continuous airtight seal at their junctions. Also directly adjacent to and radially inward of the annular surfaces 22 are like annular surfaces, indicated at 16 in Fig. 2, facing outwardly toward said gap. These surfaces 16 are adapted to receive the annulus and cooperate with the surfaces 22 to maintain a tight seal when the annulus moves inwardly due to reduced air pressure as illustrated in Fig. 3.

The tread annulus 18 is made sufficiently solid or reinforced to maintain the shape and rim contacting relation illustrated in the drawing. In a preferred form of the invention the intermediate portion of the annulus disposed between the marginal faces 20 is reinforced by cords or cables 24 built into and extending circumferentially of the annulus. It will be apparent that such construction supports the intermediate portion of the annulus against substantial radial expansion when inflated but permits expansion of the marginal portions into the air sealing contact 20—22 as illustrated in Fig. 2. An air valve communication is provided to the chamber at 26.

In Fig. 3 I have illustrated the tire with the annulus 18 applied to the rim but not fully inflated. It will be noted that the inclined surfaces 16 of the rim serve as stops limiting inward movement of the annulus and maintaining a sealing contact therewith preventing leakage and loss of air should the air pressure in the chamber become sufficiently reduced to permit inward movement of the annulus. When the tire is fully inflated the annulus is moved outwardly substantially to the position illustrated in Fig. 2.

It will be apparent that the metal body and side walls of my improved tire are adapted to take and sustain contact shocks and eliminate the bruises, breaks and blow-outs that such shocks cause to the rubber tires now in use. It will furthermore be apparent that the tread, being of substantial thickness and backed up solely by air pressure, is adapted to give resiliency at its contact with the ground. The thick tread also eliminates to a very large degree the possibility of punctures and small punctures which would deflate the present known tire will seal themselves in my improved tire. Due to the metal side walls, the circumference of the tire can be made standard while making the diameter larger and giving a wider tread, thus providing more traction, safety and less skidding when driving through snow and like conditions. The rigid metal side walls also permit the tire to be run underflated and thereby give a softer and more cushioned ride and the surfaces 16 maintain a sealing contact with the annulus when the air pressure becomes sufficiently reduced to permit inward movement of the annulus within the rim. It will also be apparent that the large metal side walls provide full support in case of a complete blow-out, whereby giving full control at all times and eliminating the present danger and accidents due to blow-outs. It is pointed out that my improved tire is particularly adapted for heavy duty use such as is required on tractors and trucks.

Having thus disclosed my invention what I claim as new and desire to secure by Letters Patent is:

An automobile tire comprising an annular metallic rim embodying continuous bottom and side walls providing therein an annular chamber open only at an annular gap therearound between the side walls at the periphery, the side walls having annular surfaces at the gap facing inwardly of the chamber and converging outwardly radially of the rim and like annular surfaces directly adjacent to and radially inward of the first named annular surfaces facing outwardly toward said gap and diverging outwardly radially of the rim, a solid annulus of resilient material having an inner portion extending into the chamber at the gap and a body portion disposed outwardly thereof and forming a tread for the tire, said inner portion being arranged to have face to face sealing contact with the first named annular surfaces when the annulus is forced radially outward by air pressure in the chamber and to have like contact with the second named annular surfaces when moved radially inward, means providing air communication through the rim to the chamber, and a plurality of reinforcing cords disposed within and extending circumferentially and annularly of the annulus between its marginal portions and limiting outward movement of said intermediate portion.

HAROLD A. HEWITT.

REFERENCES CITED

The following references are of record in the file of this patent:

UNITED STATES PATENTS

| Number | Name | Date |
|---|---|---|
| 918,684 | Macbeth | Apr. 20, 1909 |
| 1,170,957 | Burt | Feb. 8, 1916 |
| 1,413,777 | Quade | Aug. 25, 1922 |